US012785744B2

(12) United States Patent
Deng et al.

(10) Patent No.: US 12,785,744 B2
(45) Date of Patent: Nov. 3, 2026

(54) INTERFEROMETRIC RECEIVER AND TRANSMITTER

(71) Applicants: HUAWEI TECHNOLOGIES CANADA CO., LTD., Kanata (CA); La Corporation de l'École Polytechnique de Montréal, Montréal (CA)

(72) Inventors: Jie Deng, Montreal (CA); Pascal Burasa, Montreal (CA); Ke Wu, Saint-Laurent (CA)

(73) Assignees: HUAWEI TECHNOLOGIES CANADA CO., LTD., Kanata (CA); La Corporation de l'École Polytechnique de Montréal, Montréal (CA)

( * ) Notice: Subject to any disclaimer, the term of this patent is extended or adjusted under 35 U.S.C. 154(b) by 168 days.

(21) Appl. No.: 18/392,753

(22) Filed: Dec. 21, 2023

(65) Prior Publication Data

US 2025/0211272 A1 Jun. 26, 2025

(51) Int. Cl.
*H04B 1/18* (2006.01)
*H04B 1/16* (2006.01)

(52) U.S. Cl.
CPC .................................... *H04B 1/16* (2013.01)

(58) Field of Classification Search
CPC ...... H04B 1/16; H04B 1/0007; H04B 1/0014; H04B 1/0032; H04B 1/0075; H04B 1/0092
See application file for complete search history.

(56) References Cited

U.S. PATENT DOCUMENTS

| | | | | |
|---|---|---|---|---|
| 10,330,610 | B2 * | 6/2019 | Charvat | G01N 22/00 |
| 10,396,936 | B1 | 8/2019 | Mnasri et al. | |
| 10,551,162 | B2 * | 2/2020 | Floyd | G01B 9/02041 |

(Continued)

OTHER PUBLICATIONS

J. Moghaddasi and K. Wu, "Multifunction, Multiband, and Multimode Wireless Receivers: A Path Toward the Future," in IEEE Microwave Magazine, vol. 21, No. 12, pp. 104-125, Dec. 2020.

(Continued)

*Primary Examiner* — Tuan Pham
(74) *Attorney, Agent, or Firm* — Tim Tingkang Xia, Esq.; Troutman Pepper Locke LLP

(57) ABSTRACT

An interferometric receiver includes first and second antennas, each antenna being for receiving modulated microwave and terahertz signals; a first power detector for receiving a reference microwave signal and the modulated microwave signal received at the first antenna, a second power detector for receiving a phase-shifted reference microwave signal and the modulated microwave signal received at the second antenna, a third power detector for receiving a reference terahertz signal and the modulated terahertz signal received at the second antenna, and a fourth power detector for receiving a phase-shifted reference terahertz signal and the modulated terahertz signal received at the first antenna, each power detector being configured to down-convert the modulated microwave or terahertz signal received at the power detector; and circuitry configured to determine a quadrature component and an in-phase component of each of the down-converted microwave signal and the modulated terahertz signal.

9 Claims, 9 Drawing Sheets

(56) References Cited

U.S. PATENT DOCUMENTS

| | | | | |
|---|---|---|---|---|
| 11,262,458 | B2 * | 3/2022 | Akos | H01Q 5/50 |
| 2019/0200294 | A1 | 6/2019 | Brisebois et al. | |

OTHER PUBLICATIONS

P. Cheong and K. Wu, "Compendious Concurrent Dual-Band Receiver Based on Multiport Interferometric Architecture," in IEEE Transactions on Microwave Theory and Techniques, vol. 69, No. 7, pp. 3388-3398, Jul. 2021.

W. Zhang et al., "Concurrent Dual-Band Receiver Based on the Multi-Port Correlator for Wireless Applications," in IEEE Transactions on Circuits and Systems II: Express Briefs, vol. 65, No. 6, pp. 759-763, Jun. 2018.

Bevin George Perumana et al:"A Low-Power Fully Monolithic Subthreshold CMOS Receiver With Integrated LO Generation for 2.4 GHz Wireless PAN Applications." Nov. 2008. total 10 pages.

Pascal Burasa et al: "Millimeter-Wave CMOS Sourceless Receiver Architecture for 5G-Served Ultra-Low Power Sensing and Communication Systems." IEEE Transactions On Microwave Theory and Techniques, vol. 67, No. 5, May 2019. total 9 pages.

Ben W. Cook et al:"Low-Power 2.4-GHz Transceiver With Passive RX Front-End and 400-mV Supply." Jan. 2007. total 10 pages.

To-Po Wang et al:"A low-power oscillator mixer in 0.18-um CMOS technology." Feb. 2006. total 8 pages.

Pascal Burasa et al:"Low-Power Injection-Locked Zero-IF Self-Oscillating Mixer for High Gbit/s Data-Rate Battery-Free Active RFID Tag at Millimeter-Wave Frequencies in 65-nm CMOS." Mar. 2, 2016. total 11 pages.

Antonio Liscidini et al:"Single-Stage Low-Power Quadrature RF Receiver Front-End: The LMV Cell." Nov. 20, 2006. total 10 pages.

Stanley S. K. Ho et al:"A Low-Noise Self-Oscillating Mixer Using a Balanced VCO Load." Aug. 2011. total 8 pages.

Pascal Burasa et al:"A Sourceless Low-Power mmW Receiver Architecture Using Self-Oscillating Mixer Array in 65-nm CMOS." Jun. 2018. total 3 pages.

Le Zheng et al:"Design and Analysis of a Current-Reuse Transmitter for Ultra-Low Power Applications." May 24, 2009. total 4 pages.

Mabel Ponton et al:"Wireless Injection Locking of Zero-IF Self-Oscillating Mixers." Nov. 2021. total 14 pages.

Pascal Burasa et al: "Towards Future Deeply Integrated Multifunction Millimeter-Wave and Terahertz Systems-On- Chip." Aug. 2021. total 3 pages.

Eric Westberg et al:"5G Infrastructure RF Solutions: Challenges and Opportunities." Dec 2019. total 8 pages.

Tetsuya Kawanishi et al: "Wired and Wireless Links to Bridge Networks: Seamlessly Connecting Radio and Optical Technologies for 5G Networks." May 2018. total 10 pages.

Cheng-Xiang Wang et al:"Cellular architecture and key technologies for 5G wireless communication networks." Feb. 2014. total 9 pages.

Nan Chi et al:"Visible Lightcommunication in 6G: Advances, Challenges, and Prospects." Dec 2020. total 10 pages.

Peter Vetter et al:"Hexa-X—The joint European initiative to shape 6G." Jan. 27, 2021. total 9 pages.

Bilel Mnasri et al:"Spatially Distributed Multi-Input Interferometric Receiver for 5G Wireless Systems and Beyond." Nov. 2018. total 12 pages.

Yiqing Zhou et al:"Service aware 6G: An intelligent and open network based on convergence of communication, computing and caching." Jun. 20, 2020. total 11 pages.

* cited by examiner

INTERFEROMETRIC RECEIVER AND TRANSMITTER

FIELD

The present disclosure relates to wireless communications and in particular to interferometric receivers and transmitters.

BACKGROUND

Due to its resource as a broadband spectrum, high resolution, and frequency reusability, terahertz (THz) technology has recently attracted much attention in the research and development community for future wireless sensing and communication systems. In this context, the capacity and speed of THz communications are expected to greatly improve compared to microwave technology. In addition, THz technology may increasingly enable Internet of Things (IoT)-served sensor nodes, by leveraging its low latency.

However, due to severe free-space attenuation, very-high-speed THz wireless communications are inherently unreliable and are limited to short-range line-of-sight (LOS) applications. In addition, there exists a lack of high-power THz sources, making long-range communications more challenging. In contrast, the microwave band can provide reliable long-distance, i.e., non-line-of-sight (NLOS), transmission and communication. Therefore, to leverage both very-high-speed and reliable wireless communications, the integration of THz and microwave technologies is becoming more important. Such integrated systems may support multi-standard and multifunctional applications. Furthermore, because of limited usable space, it is desirable that future THz systems be incorporated into existing microwave systems.

Generally, such a coexistent communication system may be implemented by using two separate microwave and THz receiver modules. However, future 5G and 6G systems will require a countless number of low-power, low-cost, compact, multifunctional, and multi-standard sensing and communicating devices. Therefore, it would be preferable if the microwave and THz receiver blocks could be integrated into a single hardware component.

SUMMARY

According to a first aspect of the disclosure, there is provided an interferometric receiver comprising: a first antenna and a second antenna, wherein each of the first and second antennas is for receiving a modulated microwave signal and a modulated terahertz signal; a first power detector for receiving a reference microwave signal and the modulated microwave signal received at the first antenna; a second power detector for receiving a phase-shifted reference microwave signal and the modulated microwave signal received at the second antenna; a third power detector for receiving a reference terahertz signal and the modulated terahertz signal received at the second antenna; and a fourth power detector for receiving a phase-shifted reference terahertz signal and the modulated terahertz signal received at the first antenna, wherein each power detector is configured, based on the reference signal or phase-shifted reference signal received at the power detector, to down-convert the modulated microwave or terahertz signal received at the power detector, and wherein the interferometric receiver further comprises circuitry configured, based on each down-converted signal, to determine a quadrature component and an in-phase component of each of the down-converted microwave signal and the modulated terahertz signal. Therefore, a single integrated device configured for simultaneous dual-band (MW and THz) reception may be provided. Because the technology may be implemented on a single integrated device, fabrication costs may be reduced.

The interferometric receiver may further comprise at least one filter for suppressing one or more harmonic components of at least one of: the modulated microwave signal received at the first antenna; the modulated microwave signal received at the second antenna; the modulated terahertz signal received at the first antenna; and the modulated terahertz signal received at the second antenna.

The modulated microwave signal may be a signal having a frequency from 5 to 10 GHz.

The modulated terahertz signal may be a signal having a frequency from 145 to 156 GHz.

The interferometric receiver may further comprise a hybrid coupler configured to: receive the reference microwave signal and output the reference microwave signal to the first power detector; receive the phase-shifted reference microwave signal and output the phase-shifted reference microwave signal to the second power detector; receive the reference terahertz signal and output the reference terahertz signal to the third power detector; and receive the phase-shifted reference terahertz signal and output the phase-shifted reference terahertz signal to the fourth power detector.

The interferometric receiver may further comprise: a first hybrid coupler configured to receive the reference microwave signal, the phase-shifted reference terahertz signal, and the modulated microwave and terahertz signals received at the first antenna, and to output the reference microwave signal and the modulated microwave signal received at the first antenna to the first power detector, and the phase-shifted reference terahertz signal and the modulated terahertz signal received at the first antenna to the third power detector; and a second hybrid coupler configured to receive the reference terahertz signal, the phase-shifted reference microwave signal, and the modulated microwave and terahertz signals received at the second antenna, and to output the reference terahertz signal and the modulated terahertz signal received at the second antenna to the second power detector, and the phase-shifted reference microwave signal and the modulated microwave signal received at the second antenna to the fourth power detector.

The interferometric receiver may further comprise: a first hybrid coupler configured to receive the modulated microwave and terahertz signals received at the first antenna and to output the modulated microwave signal received at the first antenna to the first power detector and the modulated terahertz signal received at the first antenna to the third power detector; a second hybrid coupler configured to receive the modulated microwave and terahertz signals received at the second antenna and to output the modulated microwave signal received at the second antenna to the second power detector and the modulated terahertz signal received at the second antenna to the fourth power detector; and a reference hybrid coupler configured to receive the reference microwave and terahertz signals and to output the reference microwave signal and the phase-shifted reference terahertz signal to the first hybrid coupler, and the reference terahertz signal and the phase-shifted reference microwave signal to the second hybrid coupler.

The interferometric receiver may further comprise at least one analogue-to-digital converter configured to: receive, from each of the power detectors, the down-converted signal down-converted by the power detector; and convert each down-converted signal into a data stream for passing to the circuitry.

According to a further aspect of the disclosure, there is provided an interferometric transmitter comprising: a microwave source for generating a modulated microwave signal; a terahertz source for generating a modulated terahertz signal; a first power detector for receiving a reference microwave signal and the modulated microwave signal; a second power detector for receiving a phase-shifted reference microwave signal and the modulated microwave signal; a third power detector for receiving a reference terahertz signal and the modulated terahertz signal; and a fourth power detector for receiving a phase-shifted reference terahertz signal and the modulated terahertz signal, wherein each power detector is configured, based on the reference signal or the phase-shifted reference signal received at the power detector, to up-convert the modulated microwave or terahertz signal received at the power detector, and wherein the interferometric transmitter further comprises: a first antenna for transmitting the up-converted microwave signal; and a second antenna for transmitting the up-converted terahertz signal. Therefore, a single integrated device configured for simultaneous dual-band (MW and THz) transmission may be provided. Because the technology may be implemented on a single integrated device, fabrication costs may be reduced.

The interferometric transmitter may further comprise at least one filter for suppressing one or more harmonic components of at least one of: the demodulated microwave signal; and the demodulated terahertz signal.

The modulated microwave signal may be a signal having a frequency from 5 to 10 GHz.

The modulated terahertz signal may be a signal having a frequency from 145 to 156 GHz.

The interferometric transmitter may further comprise a hybrid coupler configured to: receive the reference microwave signal and output the reference microwave signal to the first power detector; receive the phase-shifted reference microwave signal and output the phase-shifted reference microwave signal to the second power detector; receive the reference terahertz signal and output the reference terahertz signal to the third power detector; and receive the phase-shifted reference terahertz signal and output the phase-shifted reference terahertz signal to the fourth power detector.

The interferometric transmitter may further comprise: a first hybrid coupler configured to receive the reference microwave signal, the phase-shifted reference terahertz signal, and the modulated microwave and terahertz signals, and to output the reference microwave signal and the modulated microwave signal to the first power detector, and the phase-shifted reference terahertz signal and the modulated terahertz signal to the third power detector; and a second hybrid coupler configured to receive the reference terahertz signal, the phase-shifted reference microwave signal, and the modulated microwave and terahertz signals, and to output the reference terahertz signal and the modulated terahertz signal to the second power detector, and the phase-shifted reference microwave signal and the modulated microwave signal received at the second antenna to the fourth power detector.

The interferometric transmitter may further comprise: a first hybrid coupler configured to receive the modulated microwave and terahertz signals and to output the modulated microwave signal to the first power detector and the modulated terahertz signal to the third power detector; a second hybrid coupler configured to receive the modulated microwave and terahertz signals and to output the modulated microwave signal to the second power detector and the modulated terahertz signal received at the second antenna to the fourth power detector; and a reference hybrid coupler configured to receive the reference microwave and terahertz signals and to output the reference microwave signal and the phase-shifted reference terahertz signal to the first hybrid coupler, and the reference terahertz signal and the phase-shifted reference microwave signal to the second hybrid coupler.

According to a further aspect of the disclosure, there is provided a method of demodulating radio signals, comprising: receiving a modulated microwave signal and a modulated terahertz signal at a first location; receiving a modulated microwave signal and a modulated terahertz signal at a second location spaced from the first location; receiving a reference microwave signal and a reference terahertz signal; generating a first down-converted signal by down-converting, based on the reference microwave signal, the modulated microwave signal received at the first location; generating a second down-converted signal by down-converting, based on a phase-shifted reference microwave signal, the modulated microwave signal received at the second location; generating a third down-converted signal by down-converting, based on the reference terahertz signal, the modulated terahertz signal received at the first location; generating a fourth down-converted signal by down-converting, based on a phase-shifted reference terahertz signal, the modulated terahertz signal received at the second location; and determining, based on the down-converted signals, a quadrature component and an in-phase component of each of the down-converted microwave signal and the down-converted terahertz signal.

According to a further aspect of the disclosure, there is provided a method of transmitting radio signals, comprising: generating a modulated microwave signal and a modulated terahertz signal; receiving a reference microwave signal and a reference terahertz signal; generating a first up-converted signal by up-converting, based on the reference microwave signal, the modulated microwave signal; generating a second up-converted signal by up-converting, based on a phase-shifted reference microwave signal, the modulated microwave signal; generating a third up-converted signal by up-converting, based on the reference terahertz signal, the modulated terahertz signal; generating a fourth up-converted signal by up-converting, based on a phase-shifted reference terahertz signal, the modulated terahertz signal; and combining the first and second up-converted signals, and the third and fourth up-converted signals; and transmitting the combined signals using one or more antennas.

According to a further aspect of the disclosure, there is provided an array of interferometric receivers as defined in any of the above-described embodiments, and comprising circuitry for selectively activating or deactivating one or more of the receivers in order to perform multi-beam scanning.

According to a further aspect of the disclosure, there is provided an array of interferometric transmitters as defined in any of the above-described embodiments, and comprising circuitry for selectively activating or deactivating one or more of the transmitters in order to perform multi-beam scanning.

This summary does not necessarily describe the entire scope of all aspects. Other aspects, features, and advantages will be apparent to those of ordinary skill in the art upon review of the following description of specific embodiments.

DRAWINGS

Embodiments of the disclosure will now be described in detail in conjunction with the accompanying drawings of which:

Figure 4C:
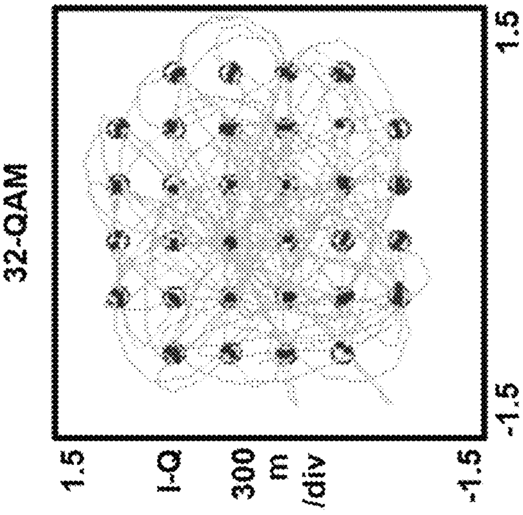
Figure 4B:
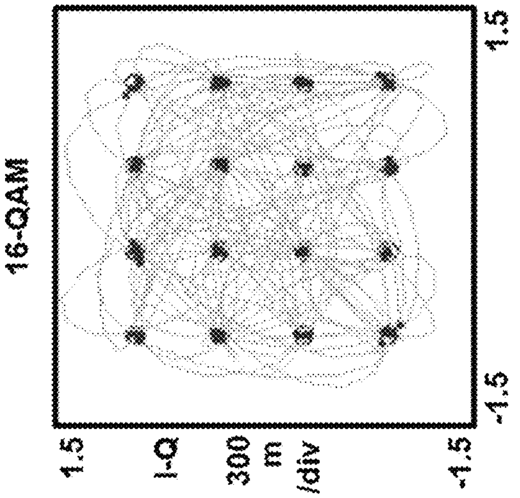
Figure 4A:
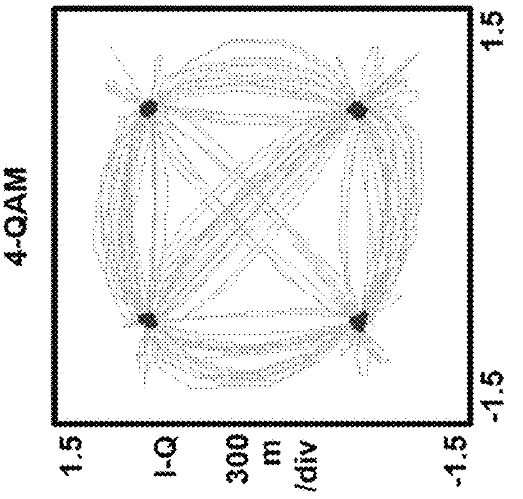
Figure 5A:
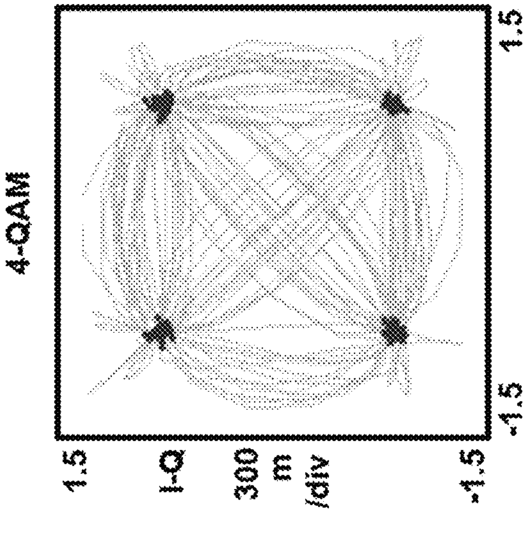
Figure 5B:
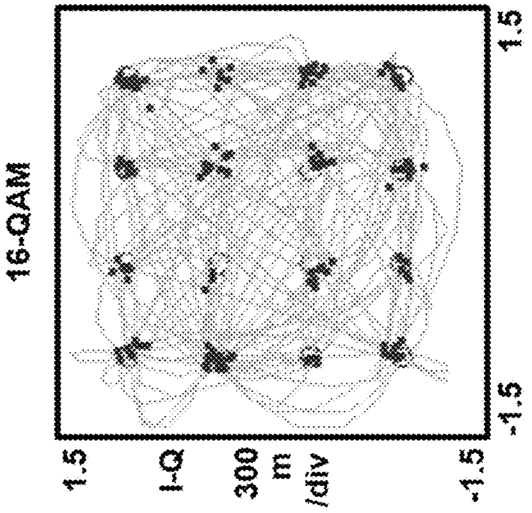
Figure 5C:
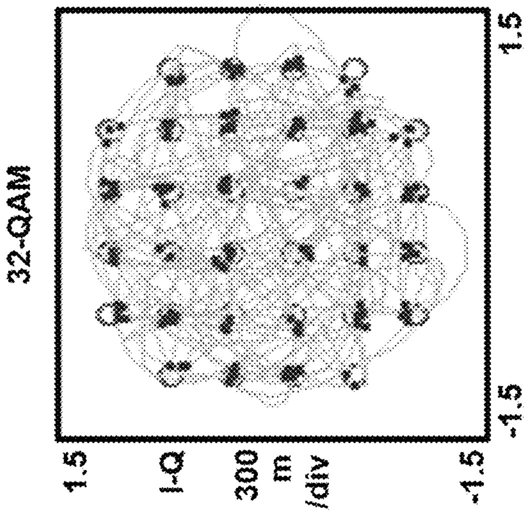
Figure 6:
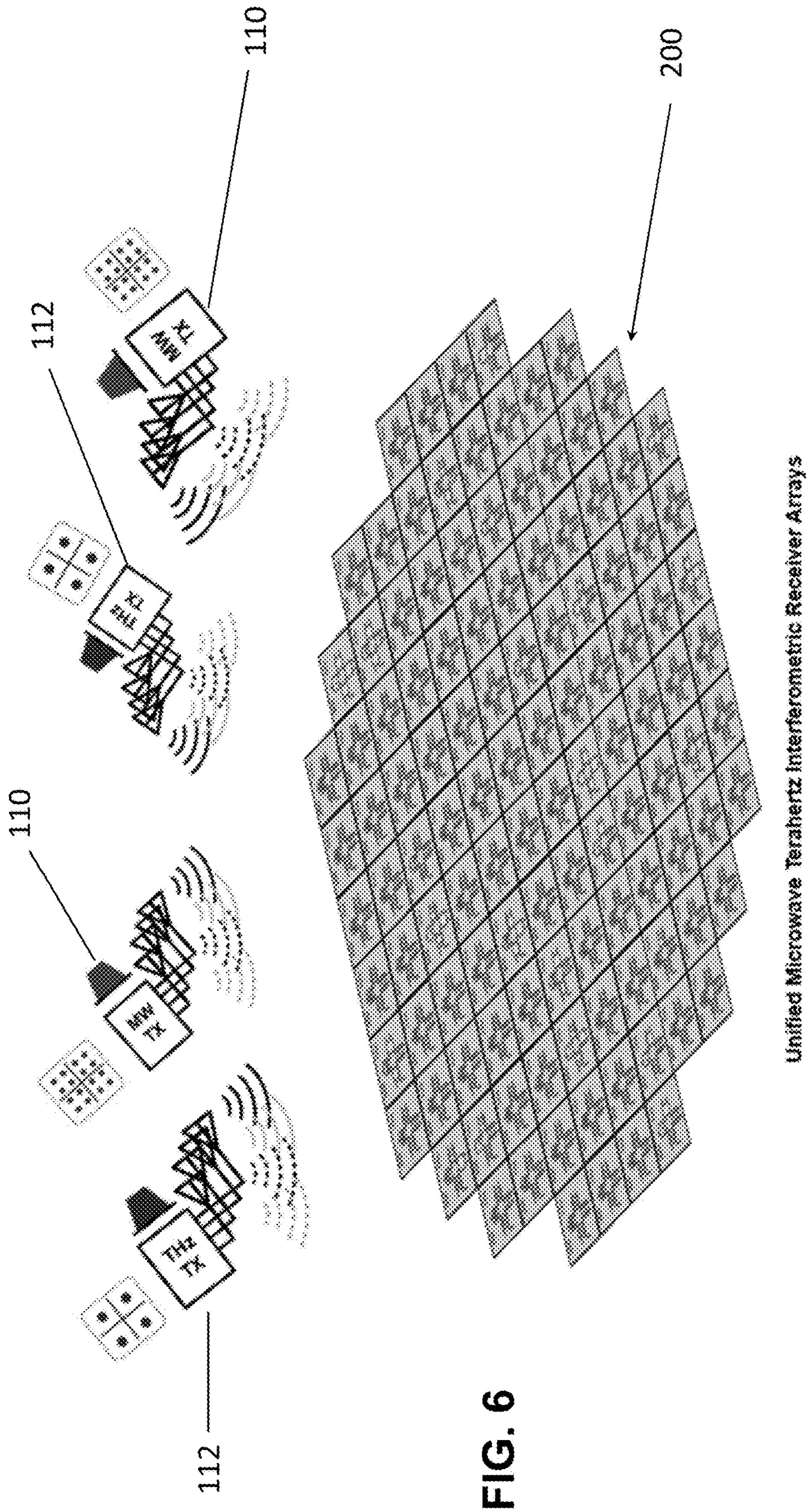
Figure 7A:
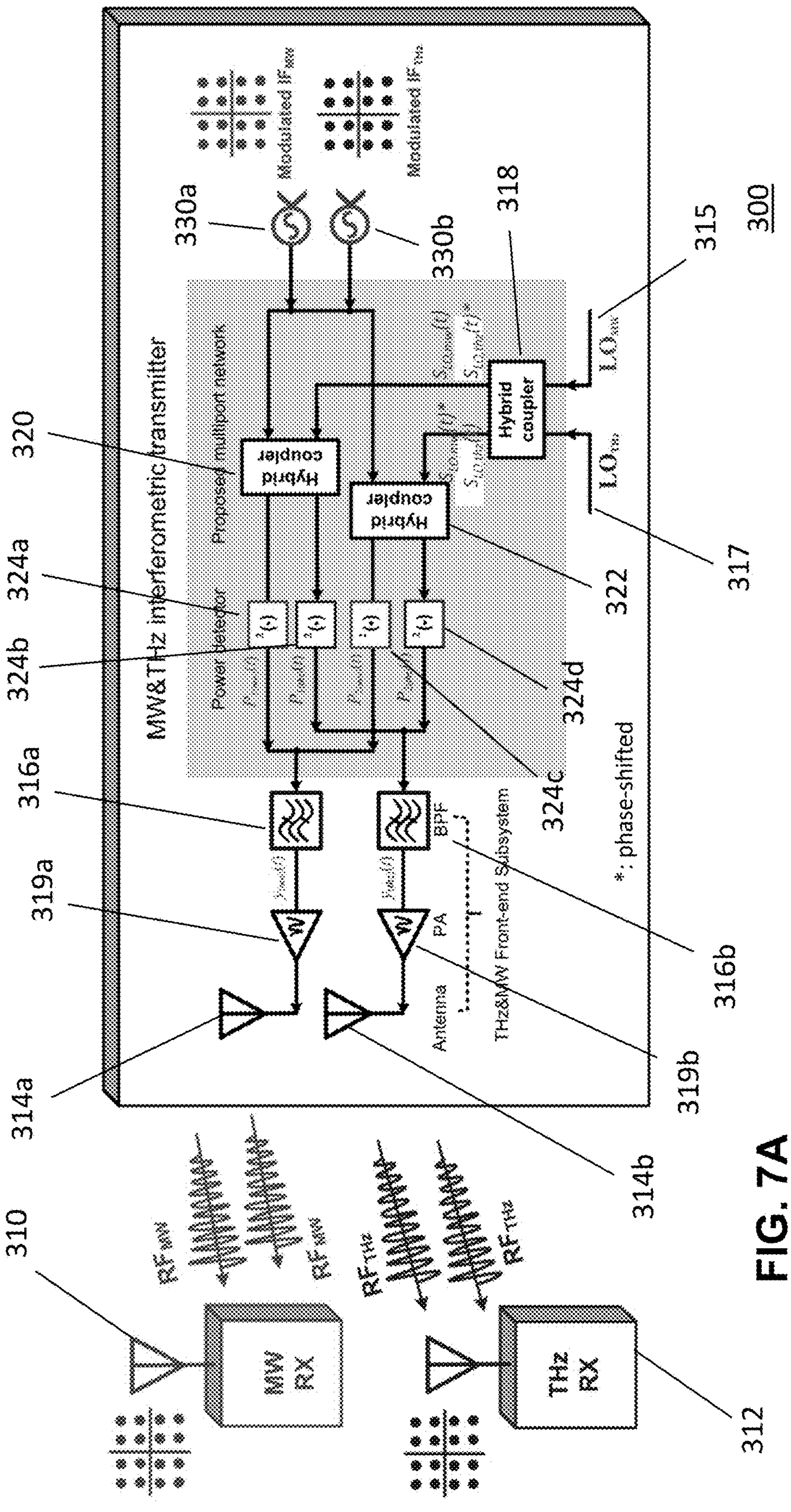
Figure 7B:
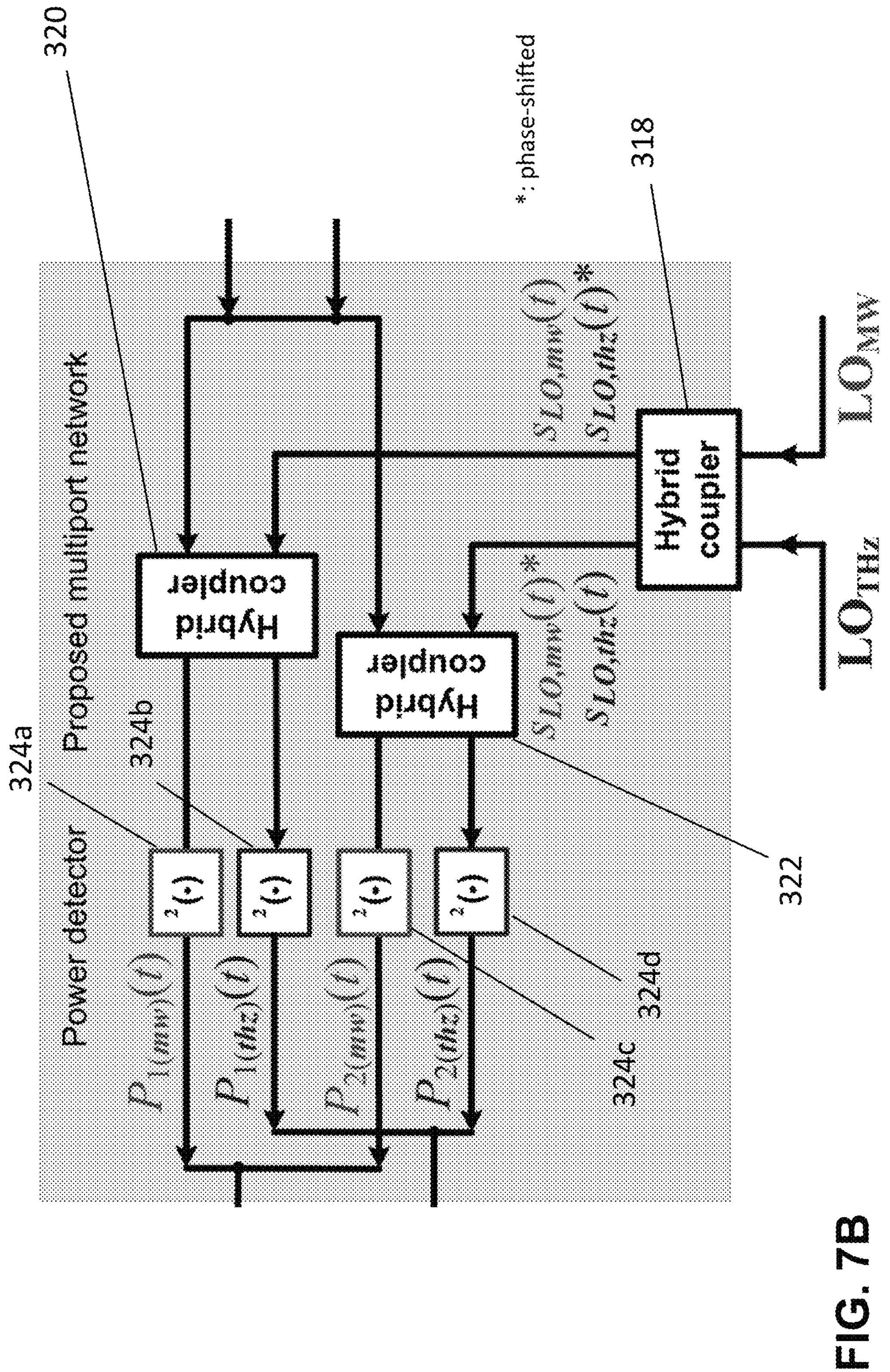

FIGS. 4A-4C are demodulated constellation diagrams of recovered baseband signals for respective 4-QAM, 16-QAM, and 32-QAM signals at the 5.8-GHz carrier frequency, according to an embodiment of the disclosure;

FIGS. 5A-5C are demodulated constellation diagrams of recovered baseband signals for respective 4-QAM, 16-QAM, and 32-QAM signals at the 150-GHz carrier frequency, according to an embodiment of the disclosure;

FIG. 6 is a schematic diagram of an array of multiple microwave and terahertz interferometric receivers, according to an embodiment of the disclosure;

FIG. 7A is a schematic diagram of an interferometric transmitter according to an embodiment of the disclosure; and FIG. 7B is a magnified view of a portion of the schematic diagram of FIG. 7A.

DETAILED DESCRIPTION

The present disclosure seeks to provide novel interferometric receivers and transmitters. While various embodiments of the disclosure are described below, the disclosure is not limited to these embodiments, and variations of these embodiments may well fall within the scope of the disclosure which is to be limited only by the appended claims.

Interferometric techniques are widely used in a variety of radio frequency (RF), microwave (MW), and mm-wave receivers, as a competitive solution for multi-standard, multiband, and multifunctional wireless systems. Compared to mixer-based architectures such as homodyne or supperheterodyne architectures, interferometry presents attractive advantages including low power consumption, a simple configuration, broadband performance, and robustness against power-level variations.

According to embodiments of the disclosure, there is described an interferometric receiver comprising a first antenna and a second antenna. Each of the first and second antennas is for receiving a modulated microwave signal and a modulated terahertz signal. The interferometric receiver includes a first power detector for receiving a reference microwave signal and the modulated microwave signal received at the first antenna, a second power detector for receiving a phase-shifted reference microwave signal, and the modulated microwave signal received at the second antenna, a third power detector for receiving a reference terahertz signal, and the modulated terahertz signal received at the first antenna, and a fourth power detector for receiving a phase-shifted reference terahertz signal, and the modulated terahertz signal received at the second antenna. Each power detector is configured, based on the reference signal received at the power detector, to down-convert the modulated microwave or terahertz signal received at the power detector. The interferometric receiver further comprises circuitry configured, based on each down-converted signal, to determine a quadrature component and an in-phase component of each of the down-converted microwave signal and the down-converted terahertz signal.

Embodiments of the interferometric receiver and transmitter described herein may be used for future multifunction and multi-standard wireless sensing and communications. Furthermore, embodiments of the interferometric receiver and transmitter described herein may enable the integration of data-energy-fusion functions, e.g., MW energy harvesting and THz communications and sensing. Therefore, embodiments of the interferometric receiver and transmitter described herein may be a viable, multifaceted platform for data transfer, energy harvesting, and sensing operations.

In contrast, conventional dual-band interferometric receivers and transmitters mainly operate in adjacent frequency bands, and cannot support simultaneous MW and THz bands. As a result, such systems are susceptible to interference from the relatively close spacing of the two adjacent operating bands. In contrast, because of the relatively large frequency separation between the MW and THz bands, embodiments of the interferometric receiver and transmitter described herein may suffer from less interference.

However, the coexistence of MW and THz signals in a single receiver/transmitter is challenging to accommodate while satisfying performance requirements, because of the large frequency ratio of MW and THz signals. As will be described in further detail below, the interferometric architecture described herein may address this problem by using two THz power detectors and two MW power detectors to down-convert the THz and MW signals simultaneously.

Embodiments of the disclosure will now be described in detail with reference to the drawings.

Figure 1A:
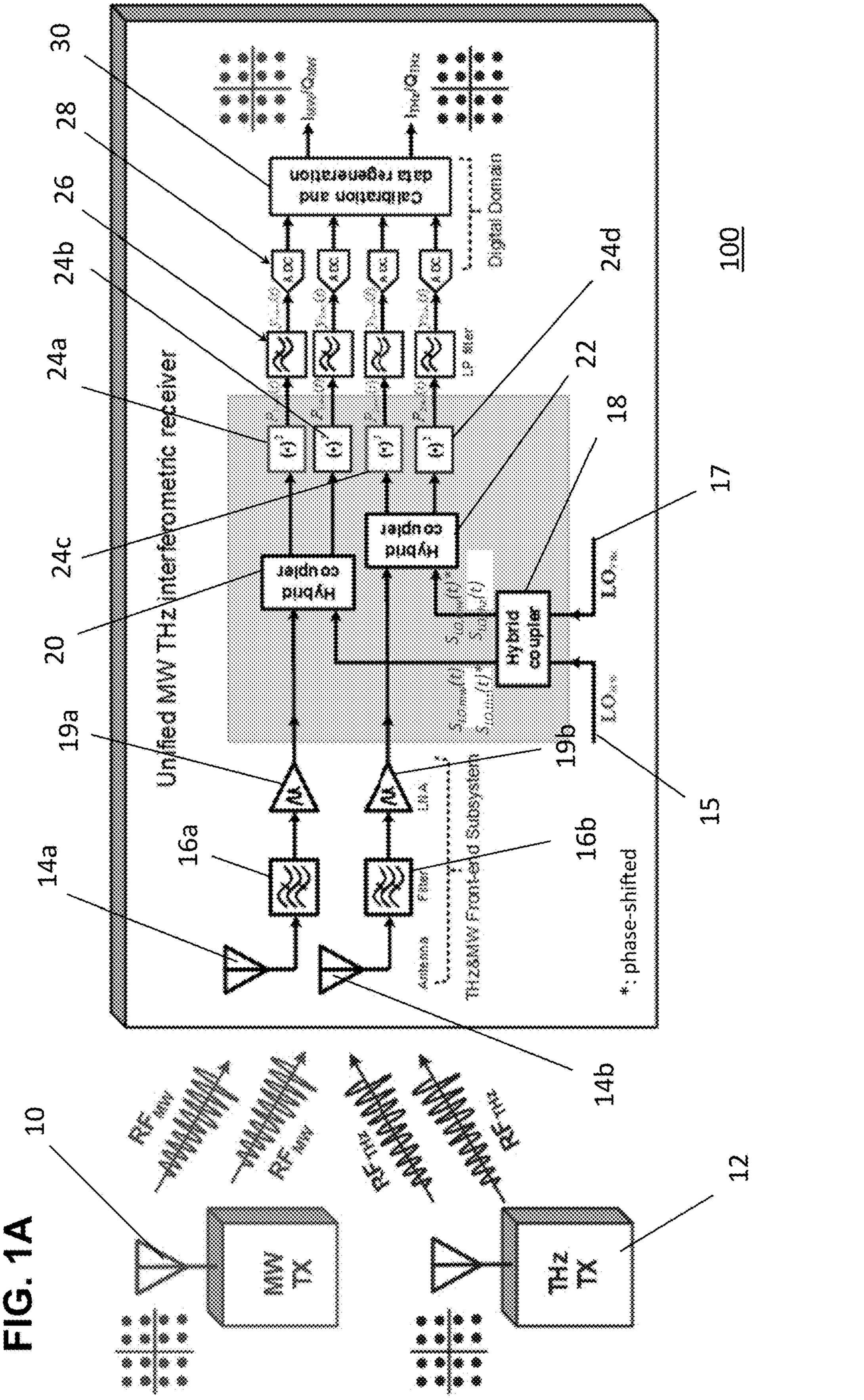
FIG. 1A is a schematic diagram of an interferometric receiver according to an embodiment of the disclosure.
Figure 1B:
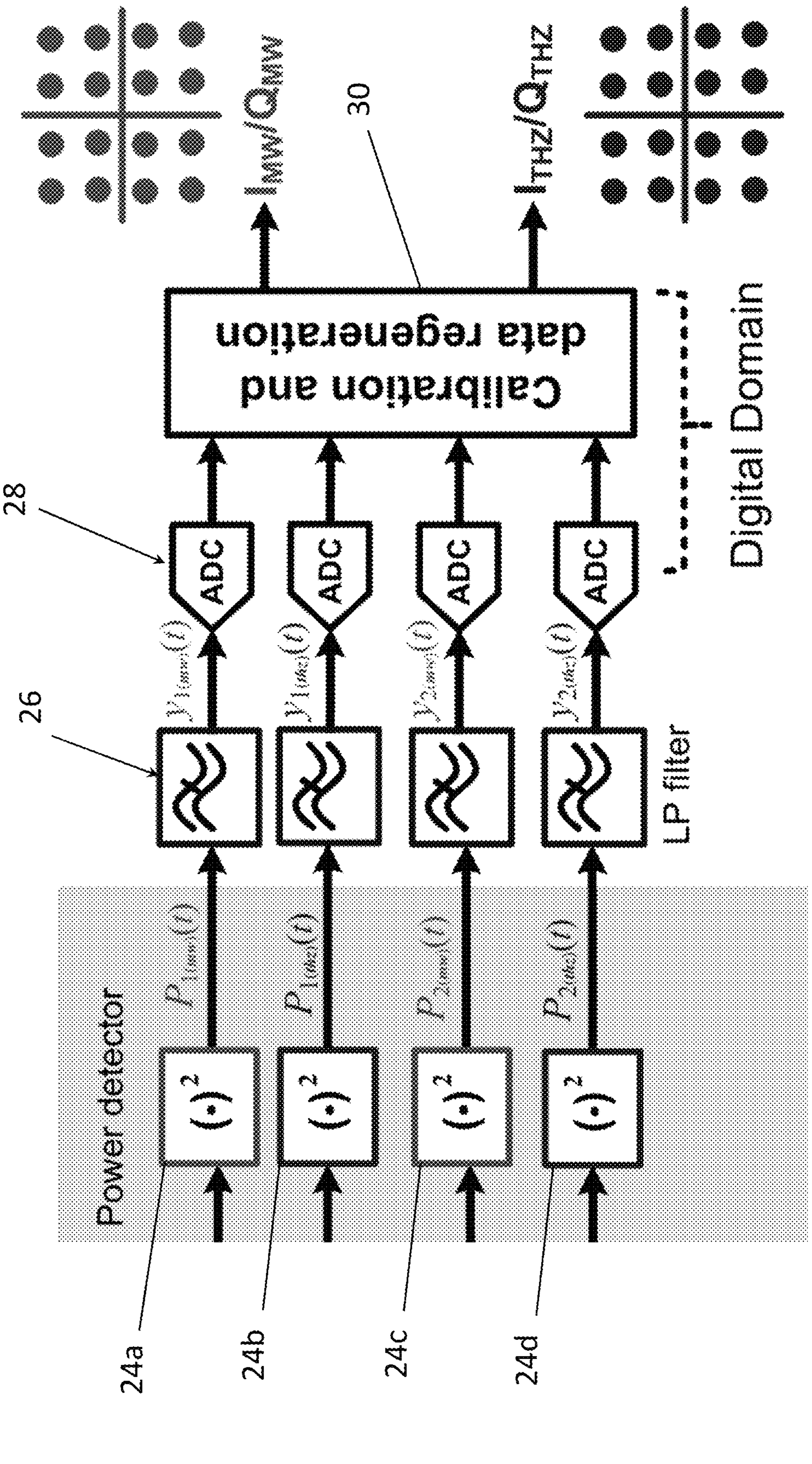
FIG. 1B is a magnified view of a portion of the schematic diagram of FIG. 1A.

Turning to FIGS. 1A and 1B, there is shown an interferometric receiver 100 according to an embodiment of the disclosure. A pair of RF signal sources are configured to transmit modulated microwave (MW) and terahertz (THz) signals to interferometric receiver 100. In particular, the RF signal sources include a MW source 10 configured to transmit MW signals to interferometric receiver 100, and a THz source 12, spaced from MW source 10, and configured to transmit THz signals to interferometric receiver 100. Interferometric receiver 100 includes a first antenna 14*a* and a second antenna 14*b*. Each antenna 14*a*, 14*b* is configured to receive both the modulated MW signal and the modulated THz signal.

Each antenna 14*a*, 14*b* is connected to a respective band-pass filter 16*a*, 16*b* for selectively allowing the MW signal or the THz signal to pass therethrough, by suppressing other harmonic components. Each band-pass filter 16*a*, 16*b* is connected to a respective low-noise amplifier (LNA) 19*a*, 19*b*. The output of each LNA 19*a*, 19*b* is connected to an input of a respective hybrid coupler 20, 22.

In addition to interferometric receiver 100 being configured to receive modulated MW signal and THz signals, interferometric receiver 100 further receives local oscillator signals 15 and 17. In particular, with reference to FIG. 1A, $LO_{MW}$ is a MW local oscillator generating the MW signal, and $LO_{THz}$ is a THz local oscillator generating the THz signal. Local oscillator signal 15 is a MW reference signal directed to the first input of a hybrid coupler 18, and local oscillator signal 17 is a THz reference signal directed to the second input of hybrid coupler 18. A first output of hybrid coupler 18 is passed to an input of hybrid coupler 20, and a second output of hybrid coupler 18 is passed to an input of hybrid coupler 22. The first output and second outputs are phase-shifted by 90 degrees. Therefore, hybrid coupler 20 receives local oscillator signal 15 and phase-shifted local oscillator signal 17, while hybrid coupler 22 receives local oscillator signal 17 and phase-shifted local oscillator signal 15.

Interferometric receiver 100 further includes four power detectors 24*a*-24*d*. Each power detector is connected to an output of one of hybrid coupler 20 and 22. In particular, power detector 24*a* receives the reference MW signal from hybrid coupler 20 combined with the modulated microwave signal received at the first antenna, power detector 24*b* receives the reference THz signal from hybrid coupler 20 combined with the modulated terahertz signal received at the first antenna, power detector 24*c* receives the phase-shifted reference MW signal from hybrid coupler 22 combined with the modulated microwave signal received at the second antenna, and power detector 24*d* receives the phase-shifted reference THz signal from hybrid coupler 22 combined with the modulated terahertz signal received at the second antenna. Each power detector is configured, based on the reference signal received at the power detector, to down-convert the modulated microwave or the modulated terahertz signal received at the power detector. In particular, each power detector 24*a-d* applies a non-linearity to the input signal, and thereby is configured to down-convert the modulated input signal. For example, the modulated signal may have a frequency of 150 GHz, the reference signal may have a frequency of 145 GHZ, and after down-conversion the down-converted, modulated signal may have a frequency of 5 GHZ (150 GHz-145 GHZ).

The output of each power detector is then passed to respective low-pass filters 26 that are configured to remove high-frequency harmonic components from the input signals. The outputs of low-pass filters 26 are then passed to respective analogue-to-digital converters (ADCs) 28 that convert the outputs of low-pass filters 26 into digital data streams that are passed to calibration and data regeneration block 30. Calibration and data regeneration block 30 comprise circuitry configured, based on each down-converted signal, to determine a quadrature (Q) component and an in-phase (I) component of each of the down-converted microwave signal and the modulated terahertz signal. In particular, the outputs of power detectors 24*a* and 24*c* are used to determine the I and Q components of the down-converted MW signal, whereas the outputs of power detectors 24*b* and 24*d* are used to determine the I and Q components of the down-converted THz signal.

As can seen, the architecture of a unified MW and THz interferometric receiver has been described in the context of FIGS. 1A and 1B. The modulated MW and THz signals sent by RF sources 10 and 12 are captured by interferometric receiver 100, and in particular the transmitted MW and THz signals are detected by each antenna 14*a* and 14*b*. The received signals are combined with MW and THz reference signals (local oscillator signals 15 and 17) and experience different relative phase differences due to the multiport network defined by hybrid couplers 18, 20, and 22. The linearly-interfering signals are passed to the four power detectors 24*a*-24*d*.

The input modulated signals, i.e. the MW signal and THz signal before their down-conversion by power detectors 24*a*-24*d*, can be expressed as:

$$a_{\_RF(MW)} = |a_{\_RF(MW)}||I_{MW}(t) + jQ_{MW}(t)|e^{jw_{RF(MW)}(t)} \tag{1}$$

$$a_{\_RF(THz)} = |a_{\_RF(THz)}||I_{THz}(t) + jQ_{THz}(t)|e^{jw_{RF(THz)}(t)} \tag{2}$$

$I_{THz}$ and $Q_{THz}$ represent the in-phase and quadrature components of the THz signal, respectively, while $I_{MW}$ and $Q_{MW}$ represent the in-phase and quadrature components of the MW signal, respectively. $a_{\_RF(THz)}$ and $a_{\_RF(MW)}$ represent the signal amplitudes. The local oscillator signals can be expressed as:

$$a_{\_LO(MW)} = |a_{\_LO(MW)}|e^{j\left(w_{LO(MW)}(t)+\Phi_{LO(MW)}\right.} \tag{3}$$

and $$a_{\_LO(THz)} = |a_{\_LO(THz)}|e^{j\left(w_{LO(THz)}(t)+\Phi_{LO(THz)}\right.} \tag{4}$$

$a_{\_LO(THz)}$ and $a_{\_LO(MW)}$ are the local oscillator signal amplitudes, and $\phi_{\_LO(THZ)}$ and $\phi_{\_LO(MW)}$ are the local oscillators phases.

MW and THz power detectors 24*a*-24*d* operate in their square-law region for the frequency conversion, where the detected voltage is in a linear relationship with the power detector's input power. This is different from heterodyne and super-heterodyne transceiver techniques that are based on extremely highly non-linear mixing approaches, and which may be regarded as non-linear interference techniques.

After passing through power detectors 24*a*-24*d*, both the modulated MW and THz signals are down-converted simultaneously. The output signals at the outputs of power detectors 24*a*-24*d* can be represented as in (5) and (6), below. For clarity, the higher-order harmonics and intermodulation products have not been presented.

$$\begin{aligned} p_{i(THz)}(t) = {} & c_0 + c_1(I_{THz}(t)\cos(2\pi f_{RF(THz)}t) - Q_{THz}(t)\sin(2\pi f_{RF(THz)}t) + \\ & K_1\cos(2\pi f_{LO(THz)}t + \phi_i)) + \frac{c_2}{4}\left(I_{THz}^2(t) + Q_{THz}^2(t) + K_1^2\right) + \\ & \frac{c_2}{2}(I_{THz}(t)K_1\cos(2\pi(f_{RF(THz)} - f_{LO(THz)})t + \phi_i) + \\ & Q_{THz}(t)K_1\sin(2\pi(f_{RF(THz)} - f_{LO(THz)})t + \phi_i)) + \\ & \frac{c_2}{2}(I_{THz}(t)K_1\cos(2\pi(f_{RF(THz)} + f_{LO(THz)})t + \phi_i) - \\ & Q_{THz}(t)K_1\cos(2\pi(f_{RF(THz)} + f_{LO(THz)})t + \phi_i)) + \\ & \frac{c_2}{4}\left(K_1^2\cos(4\pi f_{RF(THz)}t + 2\phi_i) + \left(I_{THz}^2(t) - Q_{THz}^2(t)\right)\cos(4\pi f_{LO(THz)}t) - \right. \\ & \left. 2I_{THz}(t)Q_{THz}(t)\sin(4\pi f_{LO(THz)}t)\right) \end{aligned} \tag{5}$$

$$\begin{aligned} p_{i(MW)}(t) = {} & \gamma_0 + \gamma_1(I_{MW}(t)\cos(2\pi f_{RF(MW)}t) - Q_{MW}(t)\sin(2\pi f_{RF(MW)}t) + \\ & G_1\cos(2\pi f_{LO(MW)}t + \theta_i)) + \frac{\gamma_2}{4}\left(I_{MW}^2(t) + Q_{MW}^2(t) + G_1^2\right) + \\ & \frac{\gamma_2}{2}(I_{MW}(t)G_1\cos(2\pi(f_{RF(MW)} - f_{LO(MW)})t + \theta_i) + \\ & Q_{MW}(t)G_1\sin(2\pi(f_{RF(MW)} - f_{LO(MW)})t + \theta_i)) + \\ & \frac{\gamma_2}{2}(I_{MW}(t)G_1\cos(2\pi(f_{RF(MW)} + f_{LO(MW)})t + \theta_i) - \\ & Q_{MW}(t)G_1\cos(2\pi(f_{RF(MW)} + f_{LO(MW)})t + \theta_i)) + \end{aligned} \tag{6}$$

-continued $$\frac{\gamma_2}{4}\left(G_1^2\cos(4\pi f_{RF(MW)}t+2\theta_i)+\left(I_{MW}^2(t)-Q_{MW}^2(t)\right)\cos(4\pi f_{LO(MW)}t)-2I_{MW}(t)Q_{MW}(t)\sin(4\pi f_{LO(MW)}t)\right)$$

The interferometer signals can be extracted by low-pass filters 26. Low-pass filters 26 are used to reject higher-order frequency components. Therefore, the output signals after low-pass filters 26 are:

$$y_{i(THz)}(t)=LP(p_{i(THz)}(t))=\frac{c_2}{4}\left(I_{THz}^2(t)+Q_{THz}^2(t)+K_1^2\right)+\frac{c_2}{2}I_{THz}(t)K_1\cos(2\pi(f_{RF(THz)}-f_{LO(THz)})t+\phi_i)+\frac{c_2}{2}Q_{THz}(t)K_1\sin(2\pi(f_{RF(THz)}-f_{LO(THz)})t+\phi_i). \quad (7)$$

$$y_{i(MW)}(t)=LP(p_{i(MW)}(t))=\frac{\gamma_2}{4}\left(I_{MW}^2(t)+Q_{MW}^2(t)+G_1^2\right)+\frac{\gamma_2}{2}I_{MW}(t)G_1\cos\left(2\pi(f_{RF(MW)}-f_{LO(MW)})t+\theta_i\right)+\frac{\gamma_2}{2}Q_{MW}(t)G_1\sin(2\pi(f_{RF(MW)}-f_{LO(MW)})t+\theta_i). \quad (8)$$

From equations (7) and (8), it can be seen that the desired components of the MW and THz signals can be determined and are then sent to ADCs 28. Calibration and data regeneration block 30 retrieves the data streams output from ADCs 28, and the desired in-phase (I) and quadrature (Q) information contained in the MW and THz signals can be simultaneously extracted. There may be no restrictions on the input MW and THz signals for the regeneration of the baseband signals. Therefore, the interferometric receiver described herein may concurrently demodulate the received MW and THz signals, using a single hardware platform.

Figure 2A:
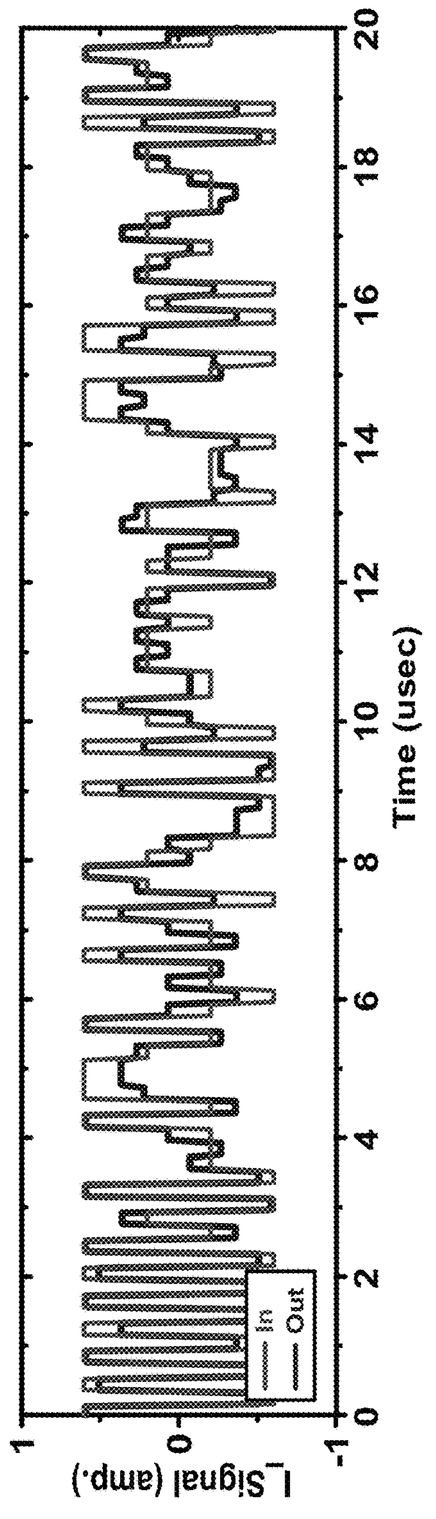
FIGS. 2A and 2B are modulated and demodulated 16-QAM input and output waveforms of respective in-phase and quadrature signals at the 5.8 GHz microwave band, according to an embodiment of the disclosure.
Figure 2B:
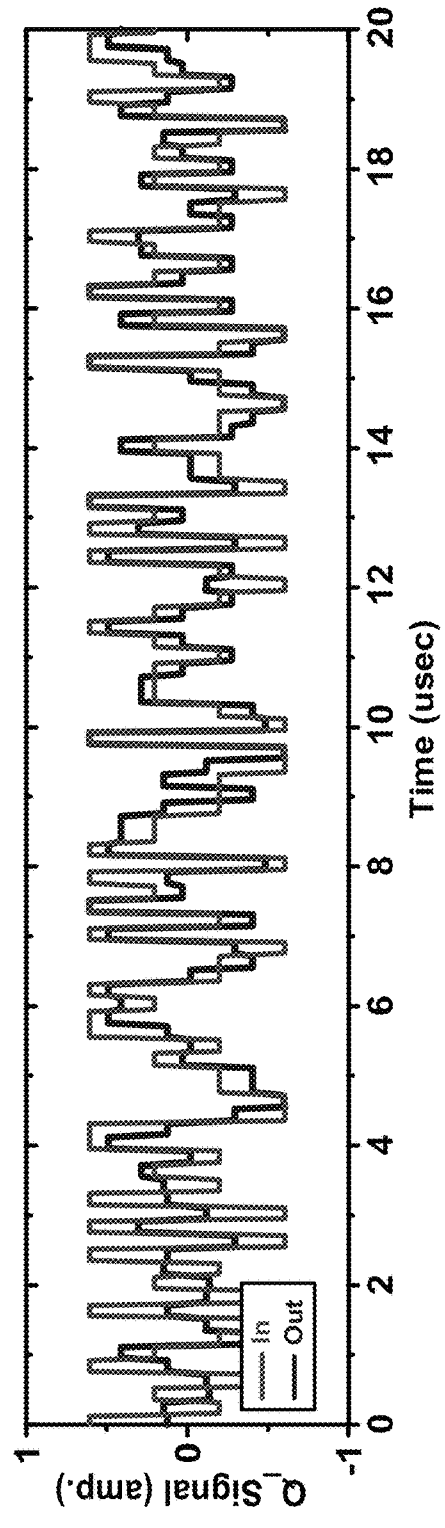
Figure 3A:
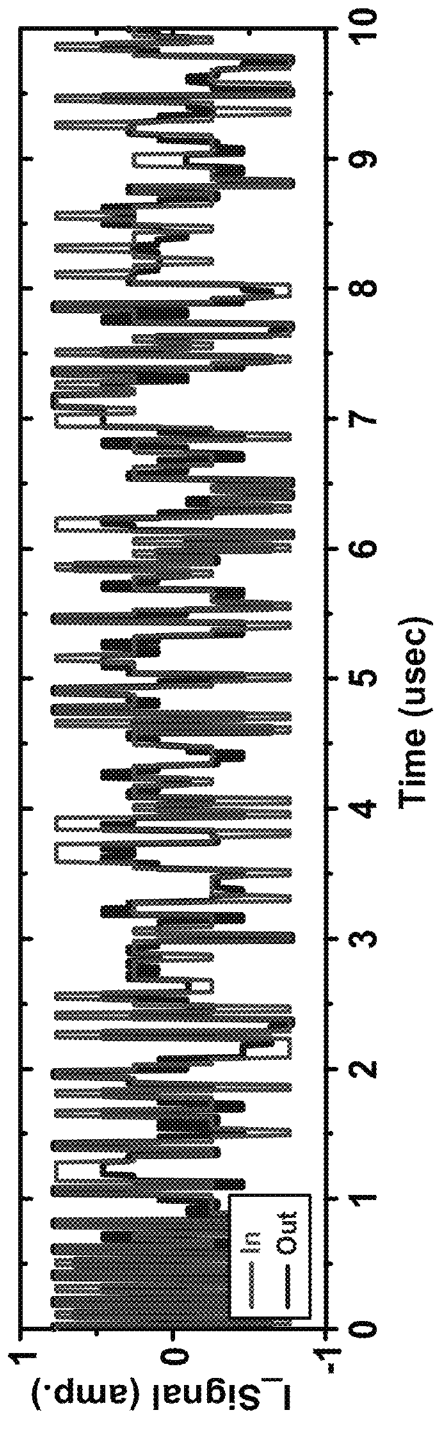
FIGS. 3A and 3B are modulated and demodulated 16-QAM input and output waveforms of respective in-phase and quadrature signals at the 150 GHz THz band, according to an embodiment of the disclosure.
Figure 3B:
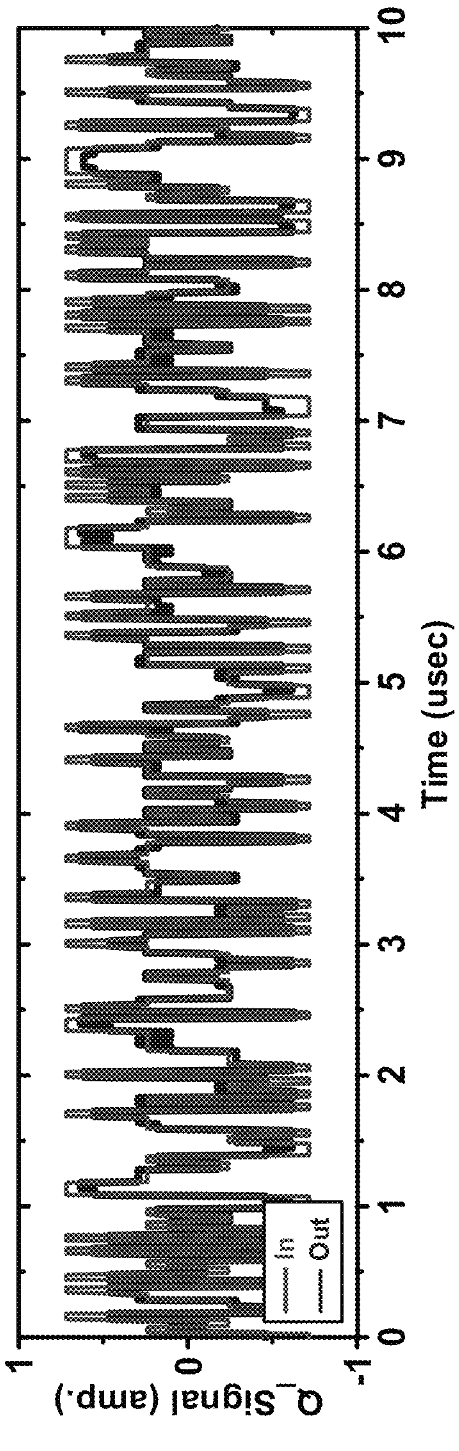

By way of illustration, FIGS. 2A and 2B show the waveforms of the input and output I and Q signals with 5-MSps for 16-QAM modulation schemes at the 5.8 GHZ MW band, and FIGS. 3A and 3B show the waveforms of the input and output I and Q signals with 100-MSps for 16-QAM modulation schemes at the 150 GHz THz band. It can be observed that the output signals I and Q are in agreement with the input signals I and Q. The demodulated constellation diagrams for both the MW and THz band are shown in FIGS. 4A-4C and 5A-5C, respectively. FIGS. 4A-4C show the demodulated constellation diagrams of recovered baseband signals for 4-QAM, 16-QAM, and 32-QAM signals, with a symbol rate of 5 MSps at 5.8 GHz. The average error vector magnitude (EVM) does not exceed −30 dB. Similarly, FIGS. 5A-5C show the demodulated constellation diagram of recovered baseband signals for 4-QAM, 16-QAM, and 32-QAM signals with a symbol rate of 100 MSps at 150 GHz. The average EVM does not exceed −24 dB.

As can be seen in FIG. 6, the interferometric receiver can also be used in an array 200 of such receivers. Receiver array 200 can enable multi-beam scanning to simultaneously receive MW and THz signals from RF sources 110 and 112. In particular, multi-beam scanning may be enabled by selectively activating, using for example a digital beam scanner, different receiver units in array 200.

While the architecture shown in FIGS. 1A and 1B generally relates an interferometric receiver, the same principles may be used in the context of an interferometric transmitter. For example, referring to FIGS. 7A and 7B, there is shown an interferometric transmitter 300, with the same elements as in FIGS. 1A and 1B labelled using similar reference numbers.

As can be seen in FIGS. 7A and 7B, interferometric transmitter 300 comprises a pair of RF sources configured to transmit respectively a modulated microwave (MW) signal 330*a* and a modulated terahertz (THz) signal 330*b* to each of hybrid coupler 320 and 322. In addition, local oscillator, or reference, signals 315 and 317 are input to a hybrid coupler 318. A first output of hybrid coupler 318 is passed to an input of hybrid coupler 320, and a second output of hybrid coupler 318 is passed to an input of hybrid coupler 322. The first output and second outputs are phase-shifted by 90 degrees. Therefore, hybrid coupler 320 receives local MW oscillator signal 315 and phase-shifted local THz oscillator signal 17, while hybrid coupler 322 receives local THz oscillator signal 317 and phase-shifted local MW oscillator signal 15.

Interferometric transmitter 300 further includes four power detectors 324*a*-324*d*. Each power detector is connected to an output of one of hybrid coupler 320 and 322. In particular, power detector 324*a* receives the reference MW signal from hybrid coupler 320 combined with the modulated microwave signal 330*a*, power detector 324*b* receives the phase-shifted reference THz signal from hybrid coupler 320 combined with the modulated terahertz signal 330*b*, power detector 324*c* receives the phase-shifted reference MW signal from hybrid coupler 322 combined with the modulated microwave signal 330*b*, and power detector 324*d* receives the reference THz signal from hybrid coupler 322 combined with the modulated terahertz signal 330*b*. Each power detector is configured, based on the reference signal received at the power detector, to up-convert the modulated microwave signal 330*a* or modulated terahertz signal 330*b* received at the power detector. In particular, each power detector 324*a-d* applies a non-linearity to the input signal, and thereby is configured to up-convert the input signal. For example, the modulated signal may have a frequency of 5 GHZ, the reference signal may have a frequency of 150 GHz, and after up-conversion the modulated signal may have a frequency of 145 GHZ (150 GHz-5 GHZ).

The outputs of power detectors 324*a* and 324*c* are combined and then passed to a band-pass filter 316*a*, and the outputs of power detectors 324*b* and 324*d* are combined and then passed to a band-pass filter 316*b*. Band-pass filters 316*a* and 316*b* selectively allow the up-converted MW signal or the up-converted THz signal to pass therethrough, by suppressing other harmonic components. Each band-pass filter 316*a*, 316*b* is connected to a respective amplifier 319*a*, 319*b*. The output of each amplifier 319*a*, 319*b* is connected to a respective antenna 314*a*, 314*b* for transmitting respectively the up-converted MW and up-converted THz signals which may be received at suitable MW and THz receivers 310, 312.

Similarly to the array 200 of interferometric receivers shown in FIG. 6, an array of interferometric transmitters (such as the interferometric transmitter shown in FIG. 7A) can also be used to enable multi-beam scanning to simultaneously transmit MW and THz signals. In particular, multi-beam scanning may be enabled by selectively activating, using for example a digital beam scanner, different transmitter units in the array.

Embodiments of the disclosure may therefore allow for a single integrated device configured for simultaneous dual-band (MW and THz) reception and transmission at high data rates (e.g., at least Gbps data rates). Because the technology may implemented on a single integrated device, fabrication costs may be reduced. Embodiments of the disclosure may be useful for thin portable devices, base stations, terminal devices, radar systems, and satellite communication.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending on the context in which these terms are used. For example, as used herein, the terms coupled, coupling, or connected can indicate that two elements or devices are directly connected to one another or connected to one another through one or more intermediate elements or devices via a mechanical element depending on the particular context. The term "and/or" herein when used in association with a list of items means any one or more of the items comprising that list.

As used herein, a reference to "about" or "approximately" a number or to being "substantially" equal to a number means being within +/−10% of that number.

Use of language such as "at least one of X, Y, and Z," "at least one of X, Y, or Z," "at least one or more of X, Y, and Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

It is furthermore contemplated that any part of any aspect or embodiment discussed in this specification can be implemented or combined with any part of any other aspect or embodiment discussed in this specification.

The invention claimed is:

1. An interferometric receiver comprising:
- a first antenna and a second antenna, wherein each of the first and second antennas is for receiving a modulated microwave signal and a modulated terahertz signal;
- a first power detector for receiving a reference microwave signal and the modulated microwave signal received at the first antenna;
- a second power detector for receiving a phase-shifted reference microwave signal and the modulated microwave signal received at the second antenna;
- a third power detector for receiving a reference terahertz signal and the modulated terahertz signal received at the second antenna; and
- a fourth power detector for receiving a phase-shifted reference terahertz signal and the modulated terahertz signal received at the first antenna, wherein each power detector is configured, based on the reference signal or phase-shifted reference signal received at the power detector, to down-convert the modulated microwave or terahertz signal received at the power detector, and wherein the interferometric receiver further comprises circuitry configured, based on each down-converted signal, to determine a quadrature component and an in-phase component of each of the down-converted microwave signal and the modulated terahertz signal.

2. The interferometric receiver of claim 1, further comprising at least one filter for suppressing one or more harmonic components of at least one of: the modulated microwave signal received at the first antenna; the modulated microwave signal received at the second antenna; the modulated terahertz signal received at the first antenna; and the modulated terahertz signal received at the second antenna.

3. The interferometric receiver of claim 1, wherein the modulated microwave signal is a signal having a frequency from 5 to 10 GHz.

4. The interferometric receiver of claim 1, wherein the modulated terahertz signal is a signal having a frequency from 145 to 156 GHz.

5. The interferometric receiver of claim 1, further comprising a hybrid coupler configured to:
- receive the reference microwave signal and output the reference microwave signal to the first power detector;
- receive the phase-shifted reference microwave signal and output the phase-shifted reference microwave signal to the second power detector;
- receive the reference terahertz signal and output the reference terahertz signal to the third power detector; and
- receive the phase-shifted reference terahertz signal and output the phase-shifted reference terahertz signal to the fourth power detector.

6. The interferometric receiver of claim 1, further comprising:
- a first hybrid coupler configured to receive the reference microwave signal, the phase-shifted reference terahertz signal, and the modulated microwave and terahertz signals received at the first antenna, and to output the reference microwave signal and the modulated microwave signal received at the first antenna to the first power detector, and the phase-shifted reference terahertz signal and the modulated terahertz signal received at the first antenna to the third power detector; and
- a second hybrid coupler configured to receive the reference terahertz signal, the phase-shifted reference microwave signal, and the modulated microwave and terahertz signals received at the second antenna, and to output the reference terahertz signal and the modulated terahertz signal received at the second antenna to the second power detector, and the phase-shifted reference microwave signal and the modulated microwave signal received at the second antenna to the fourth power detector.

7. The interferometric receiver of claim 1, further comprising:
- a first hybrid coupler configured to receive the modulated microwave and terahertz signals received at the first antenna and to output the modulated microwave signal received at the first antenna to the first power detector and the modulated terahertz signal received at the first antenna to the third power detector;
- a second hybrid coupler configured to receive the modulated microwave and terahertz signals received at the second antenna and to output the modulated microwave signal received at the second antenna to the second power detector and the modulated terahertz signal received at the second antenna to the fourth power detector; and a reference hybrid coupler configured to receive the reference microwave and terahertz signals and to output the reference microwave signal and the phase-shifted reference terahertz signal to the first hybrid coupler, and the reference terahertz signal and the phase-shifted reference microwave signal to the second hybrid coupler.

8. The interferometric receiver of claim 1, further comprising at least one analogue-to-digital converter configured to:

receive, from each of the power detectors, the down-converted signal down-converted by the power detector; and convert each down-converted signal into a data stream for passing to the circuitry.

9. An array of interferometric receivers as defined in claim 1, and comprising circuitry for selectively activating or deactivating one or more of the receivers in order to perform multi-beam scanning.

* * * * *